(12) United States Patent
Diehl, Jr.

(10) Patent No.: US 12,478,502 B2
(45) Date of Patent: Nov. 25, 2025

(54) WELLNESS DEVICE

(71) Applicant: Kenneth Diehl, Jr., Depew, NY (US)

(72) Inventor: Kenneth Diehl, Jr., Depew, NY (US)

( * ) Notice: Subject to any disclaimer, the term of this patent is extended or adjusted under 35 U.S.C. 154(b) by 0 days.

(21) Appl. No.: 18/988,994

(22) Filed: Dec. 20, 2024

(65) Prior Publication Data

US 2025/0302665 A1 Oct. 2, 2025

Related U.S. Application Data

(60) Provisional application No. 63/571,508, filed on Mar. 29, 2024.

(51) Int. Cl.
*A61F 7/10* (2006.01)
*A61M 21/00* (2006.01)

(52) U.S. Cl.
CPC .............. *A61F 7/10* (2013.01); *A61M 21/00* (2013.01); *A61F 2007/108* (2013.01); *A61M 2021/0011* (2013.01); *A61M 2021/0022* (2013.01); *A61M 2021/0027* (2013.01); *A61M 2021/0066* (2013.01); *A61M 2205/3344* (2013.01); *A61M 2230/62* (2013.01)

(58) Field of Classification Search
CPC ... A61F 7/10; A61M 21/00; A61M 2021/108; A61M 2021/0011; A61M 2021/0022; A61M 2021/0027; A61M 2021/0066; A61M 2205/3344; A61M 2230/62
See application file for complete search history.

(56) References Cited

U.S. PATENT DOCUMENTS

| | | | |
|---|---|---|---|
| 4,938,476 A | 7/1990 | Brunelle et al. | |
| 5,036,865 A | 8/1991 | Keaton | |
| 5,038,137 A | 8/1991 | Lloyd | |
| 5,113,176 A | 5/1992 | Harris | |
| 5,381,801 A | 1/1995 | McShane et al. | |
| 5,800,420 A * | 9/1998 | Gross | A61B 5/6848 600/347 |
| 6,095,991 A | 8/2000 | Krausman et al. | |
| 6,129,686 A | 10/2000 | Friedman | |
| 8,783,264 B2 | 7/2014 | Levendowski et al. | |
| 9,060,880 B2 | 6/2015 | Van Beest | |
| 9,855,006 B2 | 1/2018 | Levendowski et al. | |
| 10,020,075 B2 | 7/2018 | Perlman et al. | |
| 10,172,762 B1 * | 1/2019 | Branch | A61H 23/02 |
| 10,638,973 B2 * | 5/2020 | Levendowski | A61B 5/6822 |

(Continued)

FOREIGN PATENT DOCUMENTS

| | | |
|---|---|---|
| CN | 201134142 Y | 10/2008 |
| JP | 6336423 B2 | 6/2018 |

(Continued)

*Primary Examiner* — Tigist S Demie
(74) *Attorney, Agent, or Firm* — Harter Secrest & Emery LLP; Michael Nicholas Vranjes

(57) ABSTRACT

A wearable device for monitoring and correcting sleep posture designed to gently alert the users when they adopt a sleep position they need to avoid. The wearable device disclosed herein comprises a light weight and comfortable housing configured to be worn by a user on his arm or shoulder, a pressure-activated trigger disposed within the housing, a battery-powered vibration unit, and audible alert unit, an intensity control mechanism, and a secure attachment mechanism for affixing the device onto the user's shoulder or arm.

20 Claims, 11 Drawing Sheets

(56) References Cited

U.S. PATENT DOCUMENTS

| | | |
|---|---|---|
| 11,571,166 B2 | 2/2023 | Levendowski et al. |
| 2008/0106421 A1 | 5/2008 | Adams et al. |
| 2017/0100130 A1* | 4/2017 | Lakkireddy ........ A41D 13/1245 |
| 2017/0209333 A1* | 7/2017 | Shoup ................... A61M 21/02 |
| 2018/0199857 A1* | 7/2018 | Bayan .................. A61B 5/6823 |
| 2020/0179221 A1* | 6/2020 | Yusupov ................. A61F 5/026 |

FOREIGN PATENT DOCUMENTS

| | | |
|---|---|---|
| KR | 100769520 B1 | 10/2007 |
| KR | 20180002807 U | 10/2018 |
| WO | 2011006217 A1 | 1/2011 |

\* cited by examiner

WELLNESS DEVICE

RELATED APPLICATIONS

This application claims benefit of priority to U.S. Provisional Application No. 63/571,508 filed on Mar. 29, 2024, entitled, "Wellness Device", the entire contents of which are hereby incorporated by reference.

FIELD OF THE INVENTION

The present invention relates to a wearable device for sleep position monitoring and correction to alert individuals recovering from injuries or surgeries. More particularly, the invention relates to a comfortable and user-friendly wearable wellness device designed to help individuals avoid aggravating injuries or surgical sites during sleep.

BACKGROUND OF THE INVENTION

Sleep is essential for healing and overall well-being. It is particularly crucial for individuals recovering from injuries or surgeries, as sleep facilitates tissue repair, reduces inflammation, and promotes overall healing. However, certain injuries or post-surgical conditions necessitate avoiding specific sleep positions to optimize recovery and prevent further complications or discomfort. For example, sleeping on the affected shoulder can increase pain and impede healing in rotator cuff injuries whereas post-surgical protocols after shoulder surgeries often restrict sleeping on the operated side to protect the repaired tissues. In addition, certain sleeping positions can exacerbate back pain and hinder recovery and incorrect neck posture during sleep can worsen pain and stiffness.

Unfortunately, maintaining specific sleep positions throughout the night can be challenging, especially when individuals are unconscious or unable to consciously control their movements.

Currently, there is a lack of effective and convenient solutions to prevent individuals from inadvertently rolling into undesirable sleep positions. Current solutions for sleep position management are often inadequate. Existing methods, such as specially designed pillows or cumbersome braces and splints, can be effective in restricting movement but are often uncomfortable and disruptive to sleep and they often fail to prevent rolling into undesired positions. Furthermore, existing devices tend to be bulky, expensive, and require complex setups.

Therefore, a need remains for a comfortable, user-friendly, and an effective solution to help individuals maintain proper sleep positioning and promote optimal healing. The present invention addresses this need by providing a novel wellness wearable device that can be worn on a part of the body, wherein the device provides a vibration alert that gently alerts users when they adopt a sleep position they need to avoid, thereby empowering them to take control of their sleep posture and facilitate their recovery.

SUMMARY OF THE INVENTION

This Summary is provided to introduce a selection of concepts in a simplified form that are further described below in the Detailed Description of the invention. This Summary is not intended to identify key aspects or essential aspects of the claimed subject matter. Moreover, this Summary is not intended for use as an aid in determining the scope of the claimed subject matter.

The present application discloses a wellness wearable device designed to gently alert the users when they adopt a sleep position they need to avoid. The wellness device disclosed herein comprises a light weight and comfortable housing configured to be worn by a user on his arm or shoulder, a pressure-activated trigger disposed within the housing, a battery-powered vibration unit, and audible alert unit, an intensity control mechanism, and a secure attachment mechanism for affixing the said device onto the user's shoulder or arm. The said device provides a discreet and effective solution for preventing inadvertent rolling into an undesirable sleep positions. The said device is specifically designed to address the challenges of maintaining proper sleep posture during recovery from an injury or post-surgical recovery.

It is an object of this invention to provide a novel wellness wearable device designed to improve sleep quality and promote healing by gently alerting users of undesirable sleep positions.

It is an additional object of the invention to provide a wellness wearable device comprising housing, a pressure-activated trigger or sensor, wherein a large, sensitive, & an easy-to-use activation button or sensor triggers an alert upon compression of the said button or sensor, ensuring user comfort and effective position correction. The pressure activated trigger button is configured to detect changes in pressure and orientation, indicating shifts in the user's sleep position.

It is another object of this invention to provide a wellness wearable device comprising a battery-powered vibration unit capable of producing vibrations at varying intensities when the pressure-activated trigger is compressed due to user moving into an undesirable sleep position. The battery powered vibration unit is configured to generate tactile feedback to alert the user of undesirable sleep positions.

It is a further object of this invention to provide an adjustable intensity control mechanism coupled to the vibration unit to select the vibration intensity according to the user's preference, wherein the intensity control mechanism allows for selection among a plurality of discrete vibration intensity levels, including at least an "off" setting where no vibration is produced, a low intensity setting, a medium intensity setting, and a high intensity setting.

It is another object of this invention to provide a wellness wearable device comprising a battery-powered audible alert unit capable of emitting sounds to alert the user about the undesirable sleep position and to correct their sleep position.

It is yet another object of this invention to provide a secure and comfortable attachment mechanism designed to be comfortable, non-restrictive, and easy to apply and wear, easy to remove and to ensure the wearable device remains in place throughout the night. The said attachment mechanism includes, but not limited to, adjustable straps or armbands, a shoulder harness, or a shoulder wrap, for securely affixing the said device in place onto the user's shoulder or arm or both. The user wears the shoulder harness, the shoulder wrap, or the adjustable straps or armband with the wearable device affixed to the attachment mechanism. Whenever the user lays-on or sleeps on the user's affected or injured area, on the shoulder or the arm, the pressure-activated button or sensor is triggered to switch on a vibratory motor, thereby alerting the user to reposition themselves to a new sleep position and take pressure off from the user's affected/injured area.

In a preferred embodiment, a wearable device for monitoring and correcting sleep posture, comprising: a housing configured to be worn by a user near the site of injury on an arm or shoulder; a pressure-activated trigger disposed within the housing, wherein pressure-activated trigger is strategically positioned to detect when the user rolls onto an undesirable sleep position; a battery powered vibration unit configured to generate a vibratory alert when the pressure-activated trigger is activated, wherein the vibration unit further comprises a vibration motor disposed within the housing; an intensity control mechanism coupled to the vibration motor, wherein the intensity control mechanism is configured to allow the user to select among a plurality of vibration intensity levels generated by the vibration motor; an audible alert unit configured to generate an audible alert after a predetermined time-delay if the user does not respond to the vibratory alert; and an adjustable attachment mechanism for securing the device onto the user's body.

In another embodiment, a method of monitoring and correcting sleep posture, comprising, attaching a wearable device to a user's arm or shoulder, the wearable device comprising a pressure-activated trigger, a vibration motor, an intensity control mechanism, and an audible alert unit; setting the desired level of vibration alert through the intensity control mechanism; detecting any change in the sleep posture of the user through the pressure-activated trigger; generating a vibratory alert through the vibration motor in response to the detection to alert the user when the user assumes a predetermined sleep position, wherein the said pressure activated trigger activates the vibration alert when the user rolls onto the undesirable sleep position, and generating an audible alert via the audible alert unit if the user does not respond to the vibratory alert after a predetermined time-delay.

These together with other objects and advantages which will become subsequently apparent reside in the details of the invention as more fully described and claimed, reference being had to the accompanying drawings forming a part thereof, wherein like numerals refer to like parts throughout.

BRIEF DESCRIPTION OF THE DRAWINGS

The novel features of the invention, as well as the invention itself, both as to its structure and its operation will be best understood from the accompanying drawings, taken in conjunction with the accompanying description, in which similar reference characters refer to similar parts, and in which.

DETAILED DESCRIPTION OF THE INVENTION

Figure 1:
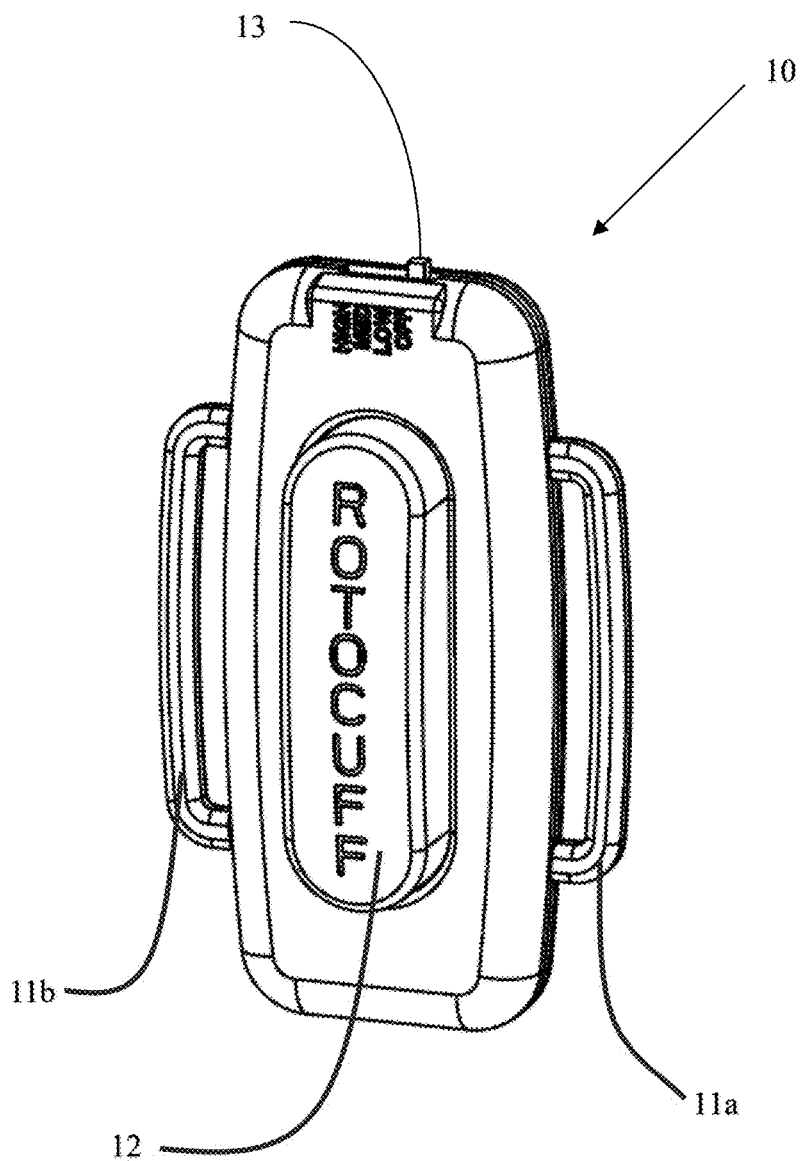
FIG. 1: shows a front view of the wearable device.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skill in the art without departing from the scope of the invention.

The invention provides a compact, lightweight, comfortable wearable wellness device specifically designed to be worn onto a user's injured shoulder or arm for minimizing sleep disruption, thereby providing user comfort and help in recovering from the injury. The wearable wellness device helps prevent further injury and promotes faster recovery by ensuring proper sleep positioning. The wellness wearable device disclosed herein is a versatile device that is suitable for various injuries and post-surgical conditions such as rotator cuff injuries, shoulder surgeries, back and neck injuries or surgeries. The wearable wellness device described herein is customizable as per individual user.

The wearable wellness device is designed to assist individuals in avoiding sleeping on their affected injured area, such as an injured shoulder, thereby preventing further injury and promoting faster healing of the affected area. As shown in FIGS. 1-6c, the wearable wellness device (10) of the present invention comprises a sensitive pressure trigger button, a battery powered vibration unit, an audible alert unit, an intensity control mechanism, and an attachment mechanism.

The sensitive pressure trigger button (12), as seen in FIG. 1, serves as both the sensor and the push-button switch that detects changes in pressure and orientation of the user's body and activates the response system of the wellness device (10) to notify the user wearing the wearable wellness device to change their sleeping position. When the user wearing the wellness device (10) inadvertently rolls onto their injured side, the pressure of the user's body on the button (12) triggers the wellness device (10) initiating a vibration followed by an audible alert, thereby prompting the user to reposition themselves and avoid further injury or delay in healing. The sensitive pressure trigger button is a critical component of the wellness wearable device of the present invention, serving as the primary interface for detecting undesirable sleep positions. The said button is designed to be prominent, easily activated, and comfortable against the user's body.

The sensitive pressure-activated trigger or button (12), as depicted in FIGS. 1-4, is intentionally designed with a large, elongated shape. This design choice provides a broad surface area for activation, ensuring that even slight movements or shifts in pressure or contact during sleep are readily detected and sufficient to trigger the vibration unit and the audible alert system of the wearable wellness device. This enhanced sensitivity enables the wearable wellness device to effectively monitor and respond to subtle changes in the user's sleep position.

As shown in FIGS. 1-4, the pressure-activated trigger or button (12) protrudes noticeably from the housing of the device (10). The said outward projection ensures that the trigger or button (12) is readily engaged when the user wearing the wellness device rolls onto an undesirable sleeping position, maximizing its sensitivity and responsiveness. Moreover, the pressure-activated trigger button (12) is securely integrated into the housing of the device (10), ensuring stable and reliable operation. The design of the wearable wellness device and strategic placement of the trigger or button prevents accidental activation while still allowing for easy engagement when needed.

Figure 2A:
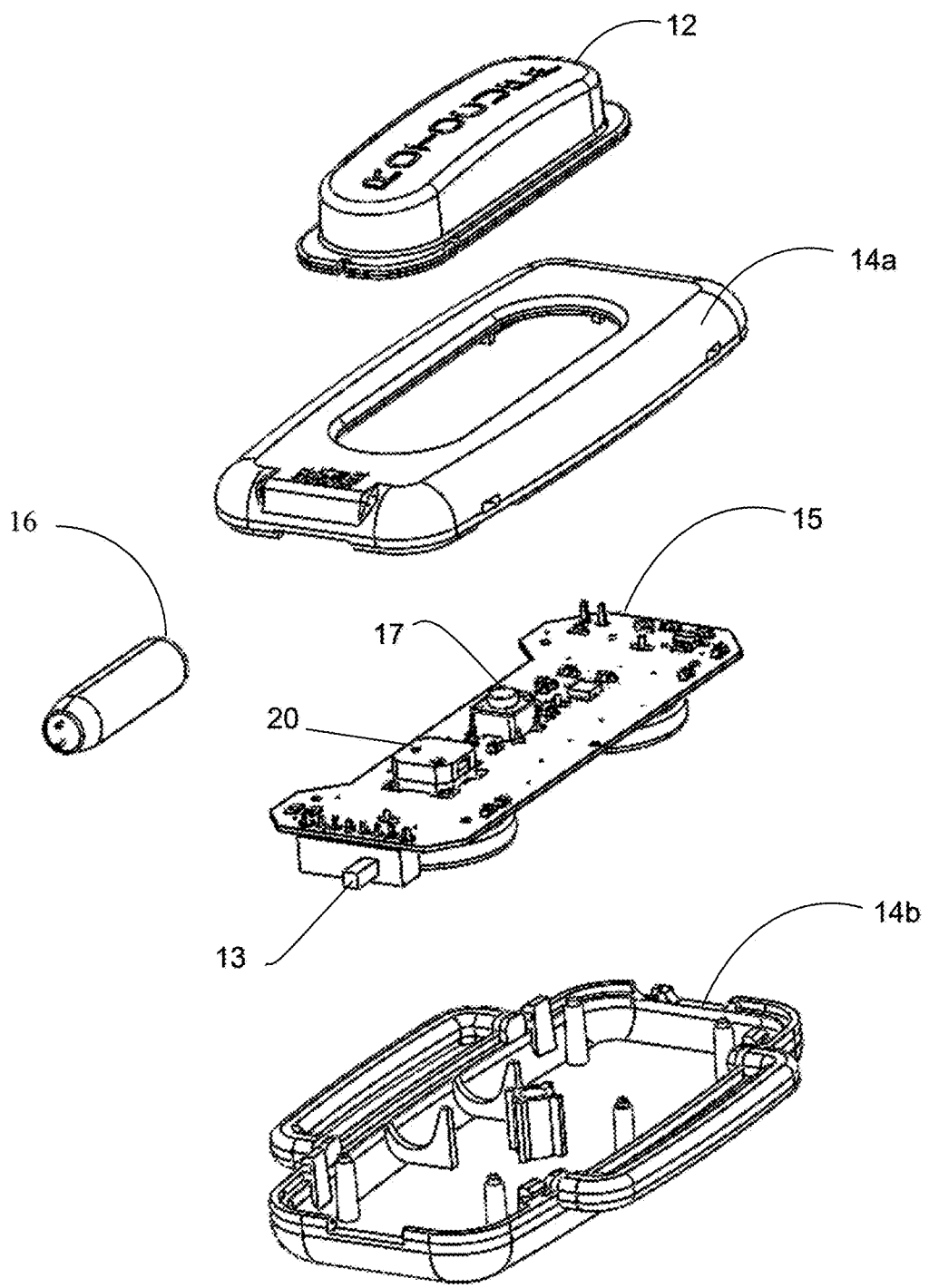
FIG. 2a: shows an exploded view of the wearable device.
Figure 2B:
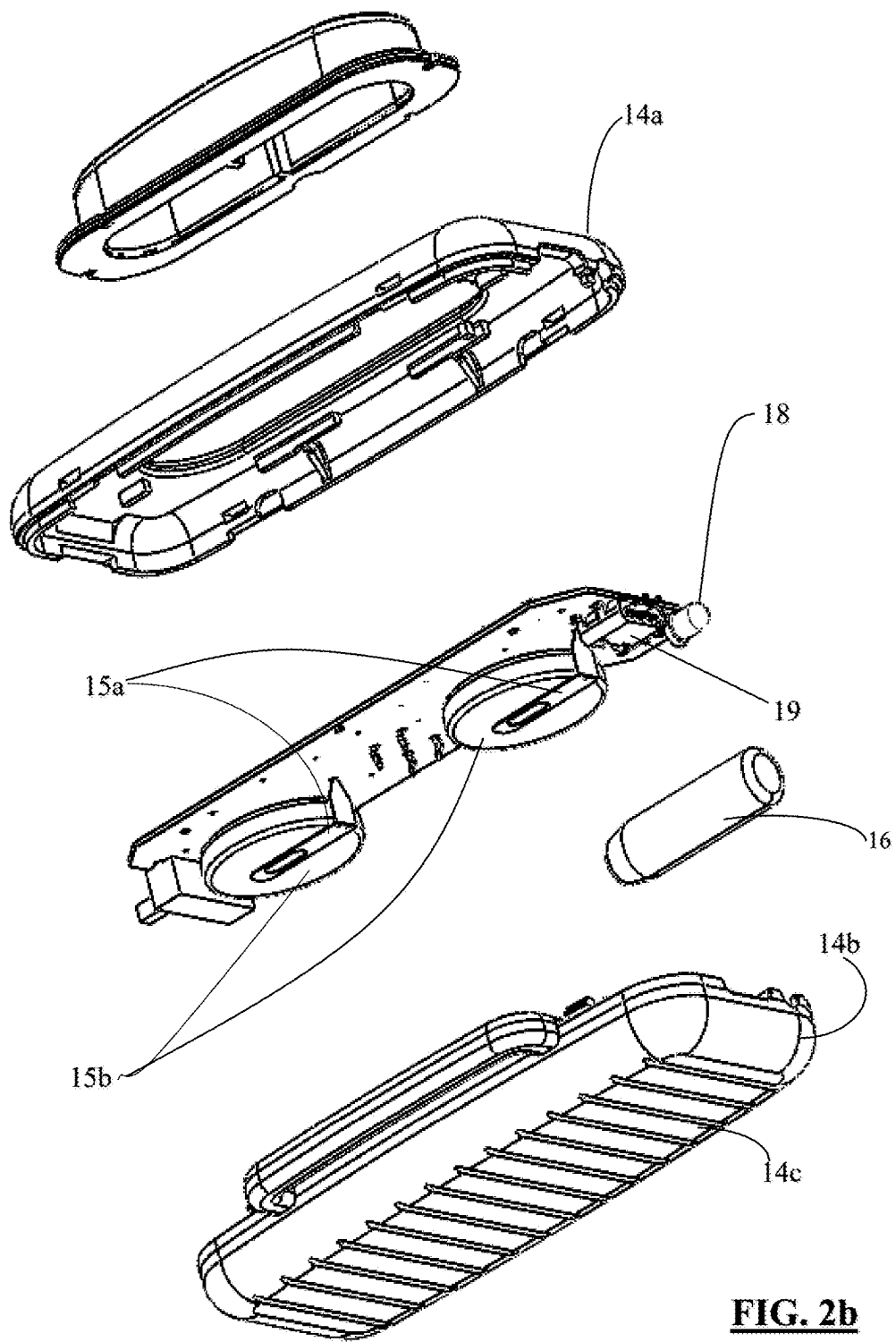
FIG. 2b: shows an exploded bottom view of the wearable device.

FIGS. 2a and 2b show the isometric expanded view of the housing of the wellness device (10) of the present invention. As seen in FIG. 2a, the wellness device (10) comprises a housing, wherein the housing further comprises a top, front cover (14a), and a bottom cover (14b); a large, elongated pressure-activated trigger button or push-button (12) as a sensor configured to trigger response upon change in position of the user wearing the device (10). The front cover (14a) and the bottom cover (14b) encloses a custom circuit board (15), wherein a battery powered vibration unit, an audible alert unit, and an intensity control mechanism is embedded therein. The custom circuit board (15) in the wellness device (10) further includes a tactile switch (17), integrated into the pressure-activated trigger or button (12), a critical component that ensures reliable and user-friendly activation of the trigger or button (12), thereby alerting the user by providing a distinct "click" sensation when pressed, offering positive feedback to the user and confirming that the device has been activated. Further, this tactile feedback provided by the tactile switch (17) integrated into the pressure-activated trigger or button (12) is particularly important for individuals with limited dexterity or visual impairments, as it allows them to confidently operate the device.

The custom circuit board (15) in the wellness wearable device (10) further includes a small, battery-powered vibration unit embedded within the housing. The vibration unit is a small, low-power motor (16) that generates subtle vibrations to alert the user. The vibration motor (16) is selected for its quiet operation and ability to generate vibrations of varying intensities when coupled with intensity control mechanism in the wellness wearable device (10). The vibrations are gentle enough to avoid startling the user awake but strong enough to prompt a subconscious adjustment in sleep position.

Further, the wearable wellness device (10) is equipped with an intensity control mechanism to adjust the intensity of vibrations generated by the vibration motor (16), thereby customizing the user experience and accommodating individual preferences and sensitivities. The intensity control mechanism comprises a slide switch (13), configured to allow multi-positional adjustments for selecting among a plurality of discrete vibration intensity levels of vibrations generated by the vibration motor (16). These levels include, at a minimum, an off (13a) setting where no vibration is produced, a low (13b) intensity setting, a medium (13c) intensity setting, and a high (13d) intensity setting, as seen in FIG. 1. The intensity control mechanism is coupled to the vibration unit (16) and is configured to receive user input for selecting a desired vibration intensity level. It then adjusts an output signal to the vibration unit accordingly.

Figure 4:
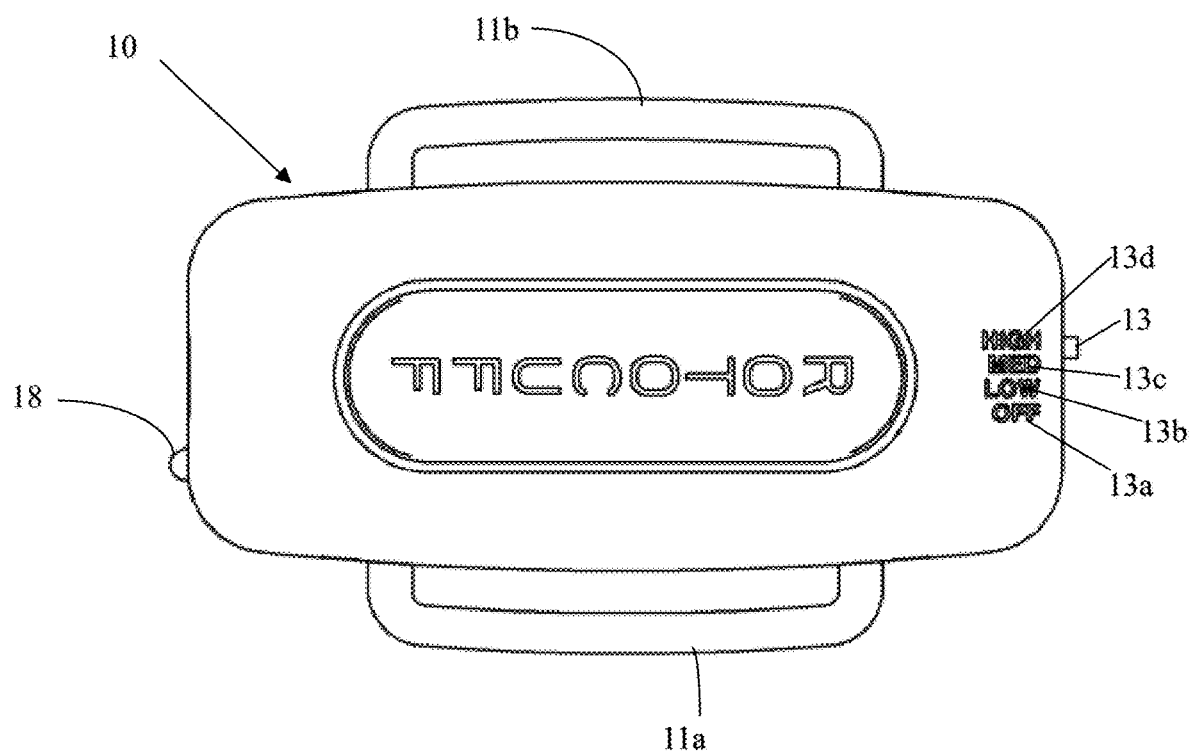
FIG. 4: shows a horizontal front view of the wearable device.

The combination of a slide switch (13) and a multi-switch setting (13a-13d), as illustrated in FIG. 4, provides a sophisticated and highly customizable escalating response system. The slide switch (13) is configured to allow the user to select among a plurality of predefined vibration intensity levels. This arrangement enables a graded response, wherein the intensity of the alert increases if the user does not initially respond to a low intensity level. The intensity control mechanism contributes to an escalating response system designed to ensure the user adjusts their position, even if they initially sleep through the initial vibration generated by the vibration motor (16). When the pressure-activated trigger or button (12) is depressed, indicating the user is lying on the affected area, the vibratory motor (16) immediately activates. This initial alert vibrates to notify the user, without causing significant disturbance, that they are lying on their injured body part and should change their position.

The wearable wellness device further comprises a built-in audible alert unit (20), shown in FIG. 2, thereby enhancing the effectiveness of the escalating response system. The audible alert unit (20) is a miniature speaker that emits a gentle sound to further alert the user, providing an alternative or complement to the vibration alert. The audible alert or secondary alert system is activated via a "watchdog circuit" that monitors the activity of the wellness device. If the primary vibratory alert fails to prompt the user to reposition themselves, a second response or secondary audible alert is triggered after a set time-delay or dwell time, providing a more aggressive alert. Thus, if the user wearing the wellness device triggers the sensor button by moving onto their injured side, the device initially vibrates. If the user doesn't respond by changing position, the device emits an audible alert after a predetermined delay of 10-30 seconds of vibration of the device, the watchdog circuit triggers the audible or secondary user alert.

In one embodiment, the time-delay for the secondary alert can be adjusted based on user preference or the specific needs of their injury. This allows for further customization of the escalating response system. For example, a user with a more sensitive injury may prefer a shorter time-delay to minimize the duration of incorrect positioning. Thus, Off-Low-Medium-High settings (13a-13d) of the slide switch (13), which controls the intensity of the vibration, also allows the user to adjust the dwell/delay time for the audible alert activation, anywhere between 10-30 seconds.

The intensity of the vibration depends upon the multi-settings of the slide switch, wherein the setting 'Off' (13a) activated by the slide switch (13) indicates the device is turned off or completely deactivated. When the setting 'Low' (13b) is activated by the slide switch (13), the vibratory motor (16) receives low voltage, resulting in a gentle vibration of the said device resulting in first response or primary initial user alert to subtly alert the user. If the said primary initial user alert fails to prompt the user, the secondary audible buzzer is activated after a 30-second delay. The low-level setting followed by a 30 second delay audible alert is ideal for individuals who are light sleepers or prefer a more gradual escalation of alerts. When the setting 'Medium' (13c) is activated by the slide switch (13), the vibratory motor (16) receives mid-level voltage, providing a more noticeable vibration of the said device. The secondary audible buzzer is activated after a 20-second delay if the user does not respond to the mid-level vibration of the device. The mid-level setting followed by a 20 second delay audible alert offers a balanced approach, providing a clear alert without being overly jarring. However, the setting 'High' (13d) activated by the slide switch (13) results in the vibratory motor (16) receiving maximum voltage, delivering the strongest vibration of the device to ensure the user is alerted. The secondary audible buzzer is activated after a 10-second delay if the user does not reposition themselves after the high-level vibration of the device. The high-level setting followed by a 10 second delay audible alert setting is suitable for individuals who tend to sleep deeply or require a more insistent alert. The multi-position switch allows users to fine-tune the alert system to their specific needs and preferences, ensuring the device is both effective and considerate of their sleep environment.

The provision of both vibratory and audible alerts offers a multi-modal approach to sleep position correction. This approach caters to a wider range of users, including those who may be heavy sleepers or have difficulty perceiving subtle vibrations. The combination of alerts increases the likelihood of successful intervention and promotes optimal healing and recovery.

The wellness device may also incorporate a visible alert in the form of a light around the pressure-activated trigger or button (12), thereby illuminating the area around the button (12), or a simple LED light (18) on the device enclosure as can be seen in FIG. 4. The said light provides an additional visual cue, not only for the user but also for anyone else within sight, such as a caregiver present in the room. This visual alert serves as a clear indication that the wellness device has been activated and that the user may need assistance in repositioning themselves away from the affected or injured shoulder or side of the body. The wellness device comprising the dual alert system, combining the vibration and light, ensures that the user receives a clear and effective signal to reposition themselves, promoting proper healing and uninterrupted sleep.

In one embodiment, the wearable wellness device may also include advanced connectivity features which may include, but not limited to, integrated WiFi and Bluetooth technology, thereby enabling the device to communicate and connect with a central monitoring system, a dedicated alert station, or a user-friendly phone app. The said connectivity feature is particularly crucial for individuals with hearing loss who may not perceive the vibrational or visual alerts. When a user wearing a wellness device activates the pressure-activated trigger or button, a series of alerts are initiated. If the user is unable to perceive the initial vibratory alert or the subsequent audible alert, a "watch dog circuit" within the wellness device is activated. This action sends a signal to a connected system or app, notifying caregivers or family members with a notification that the user may be lying on their injured side and/or may require assistance. The alert ensures that even users with sensory limitations receive timely support and maintain proper sleep positioning throughout the night.

In one embodiment, the intensity control mechanism configured to control the intensity levels of the vibrations can be adjusted via a smartphone application connected to the device via Bluetooth. An application offer more fine-grained control and potentially track usage patterns and allows for adjustments without needing to touch the device while in bed.

Furthermore, the multi-faceted alert system, combining vibration, sound, light, and wireless connectivity, ensures that a wide range of users receive a clear and effective signal to reposition themselves, promoting proper healing and uninterrupted sleep.

The batteries (15b) in the battery holders (15a) are rechargeable and provides sufficient power for extended use, typically lasting for a full night's sleep. The wearable wellness device further comprises a charging system configured to replenish the power supply of the wellness device, wherein the charging system is communicatively coupled to the housing. The charging system, may include, but not limited to a USB-C rechargeable circuitry system wherein USB-C port is configured to receive a USB-C connector; and a Faraday charge pad configured to inductively charge the wellness device when the wellness device is placed in proximity to the Faraday charge pad. The said USB-C rechargeable system eliminates the need for disposable batteries and allows for easy charging using a standard USB-C cable, making it compatible with a wide range of charging sources, including power banks, laptops, and wall chargers. The USB-C rechargeable circuitry system may further comprise a charge LED indicator providing a visual confirmation of the charging status, ensuring the device is always ready for use.

The wellness device of the present invention further includes a comfortable and adjustable attachment mechanism to securely hold the device in its place throughout the night. The user may wear the wearable wellness device (10) on their shoulder, arm, or both, securing it with the provided attachment mechanism. The attachment mechanism includes armband (30), shoulder wrap (40), and shoulder harness (50). The attachment mechanism is made of a flexible, breathable, and machine-washable material. The attachment mechanism can be manufactured in a variety of colors and sizes.

Figure 3:
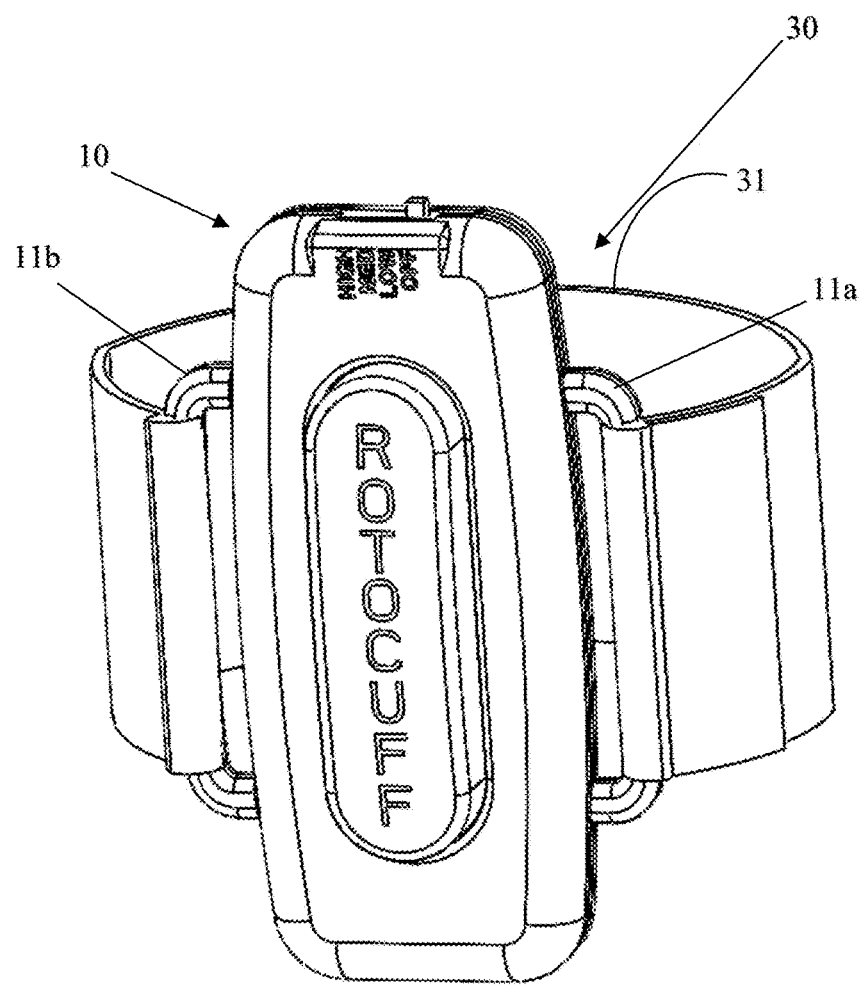
FIG. 3: depicts a view of the wearable device with arm bands affixed to the device.

FIG. 3 depicts an embodiment of an attachment mechanism for securing the wellness device (10) to the user. The mechanism includes an armband (30) adapted to be secured around the user's shoulder. The armband (30) comprises a plurality of fastening bands or straps (31) attached thereto. The plurality of bands or straps (31) are configured to engage with corresponding arms (11a, 11b) provided on each side of the housing of the wellness device (10).

Figure 5A:
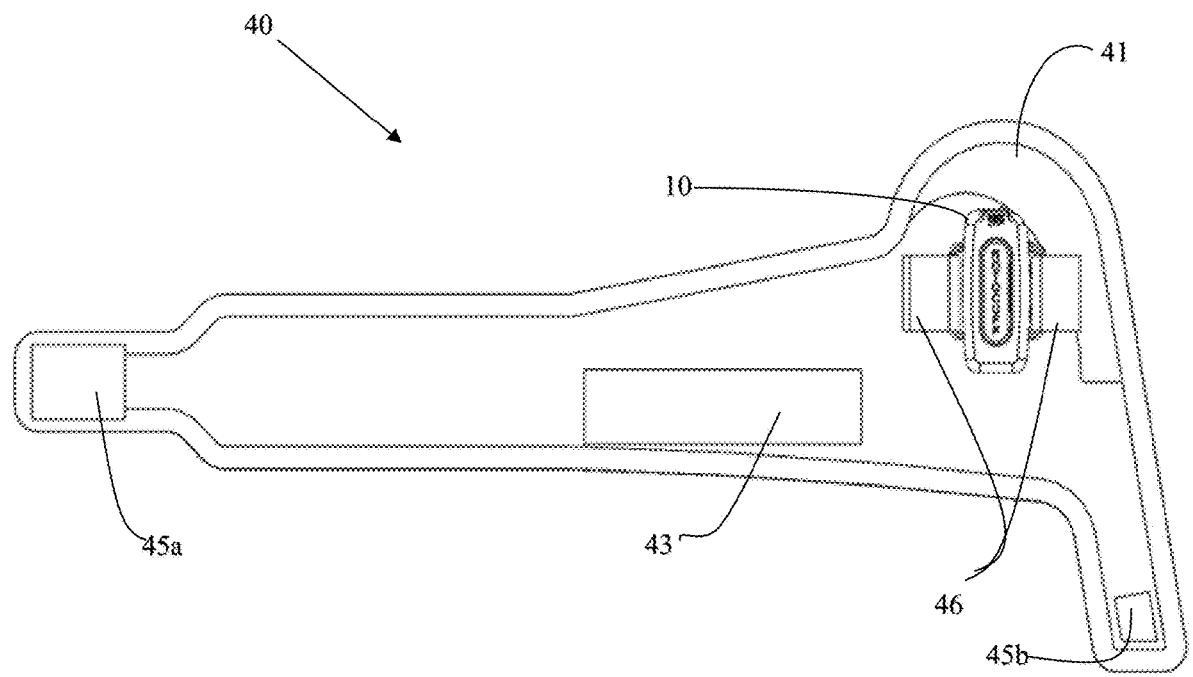
FIG. 5a: shows a view of the wearable device affixed in an shoulder wrap
Figure 5B:
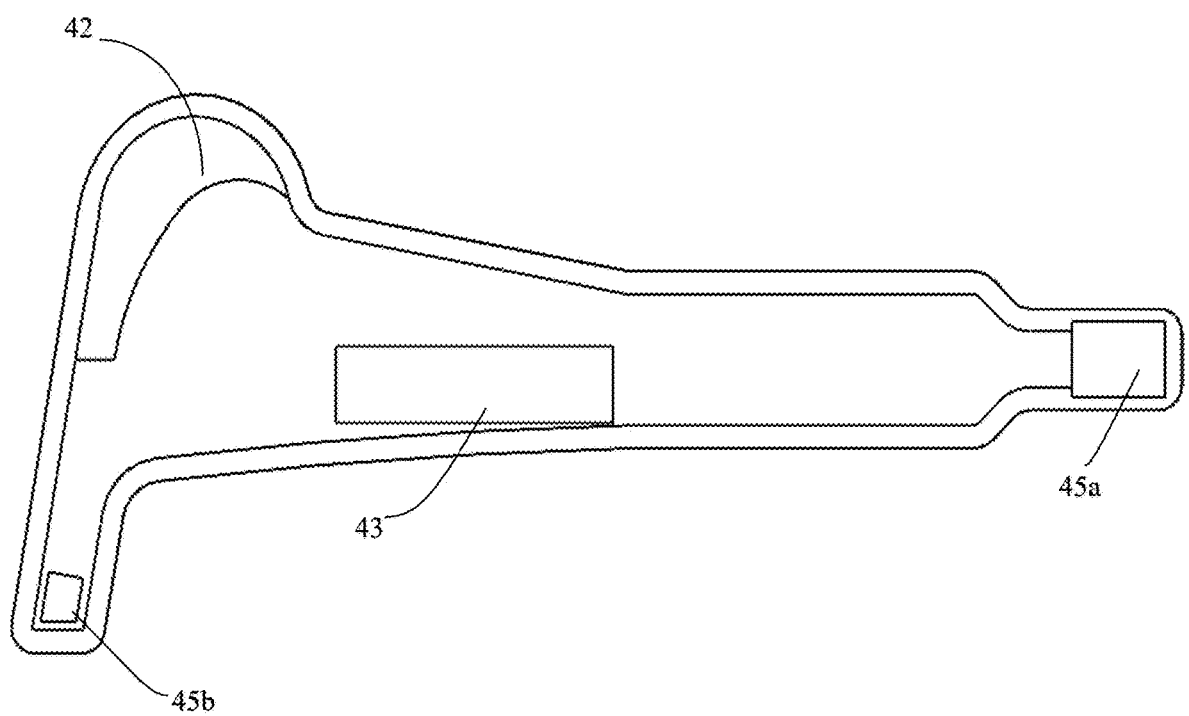
FIG. 5b: shows a back view of the shoulder wrap.
Figure 5C:
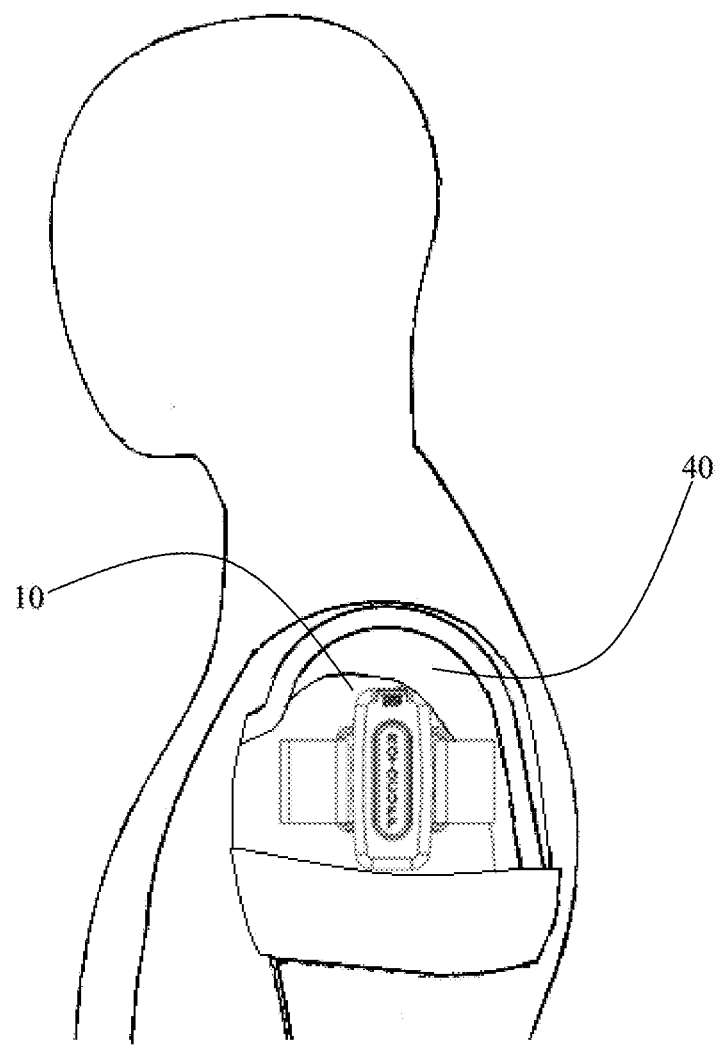
FIG. 5c: shows a side view of user wearing the shoulder wrap, the wearable device affixed in there, placed on one arm of the user

In another embodiment, the wellness device (10) can be worn with a specially designed shoulder wrap (40), as shown in FIGS. 5(a)-5(c), to ensure a secure and comfortable fit for the user. The shoulder wrap (40) is worn on the upper arm of the user by first attaching the wellness device (10) on the front (41) of the shoulder wrap (40). The shoulder wrap (40) affixed with the wellness device is wrapped snugly around the upper arm of the user by holding a strap having a first hook fastener (45b) in their opposite hand. The second strap portion having a second hook fastener (45a) is wrapped around the arm, wherein the first and second hook fasteners are configured to engage with the loop fastener (43) to securely fasten the shoulder wrap around the user's arm, allowing a customized and comfortable fit. This simple application process makes it easy for users to wear the device (10) throughout the night without any slippage or discomfort.

Figure 6A:
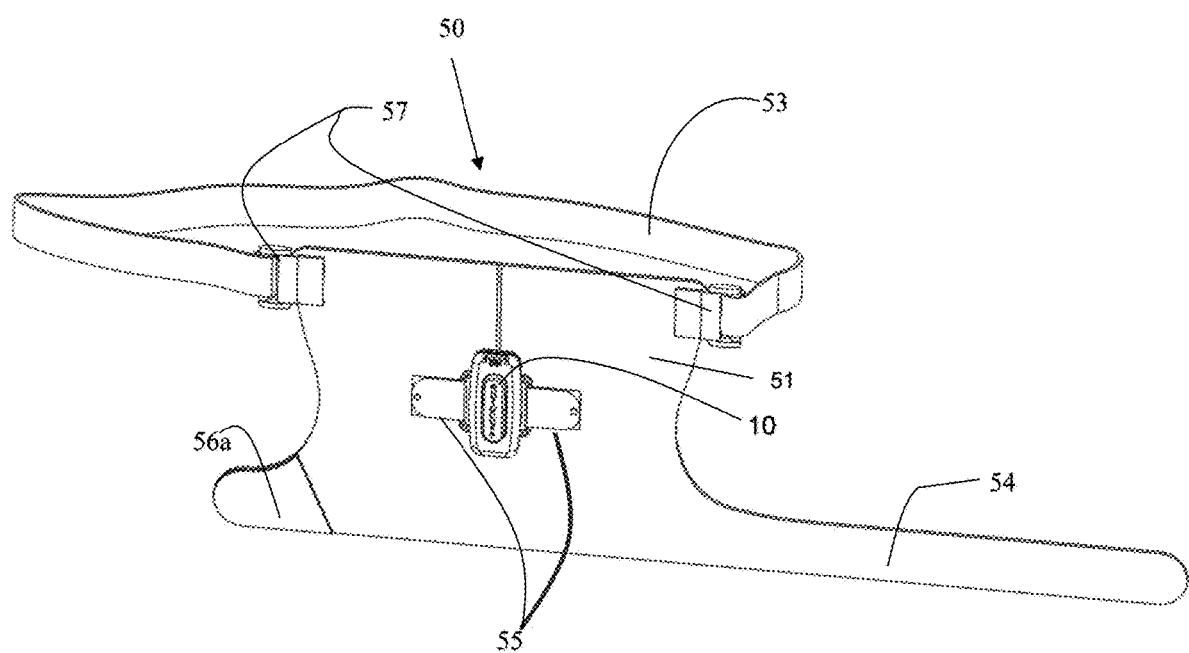
FIG. 6a: shows a front view of a shoulder harness with wearable device affixed in there.
Figure 6B:
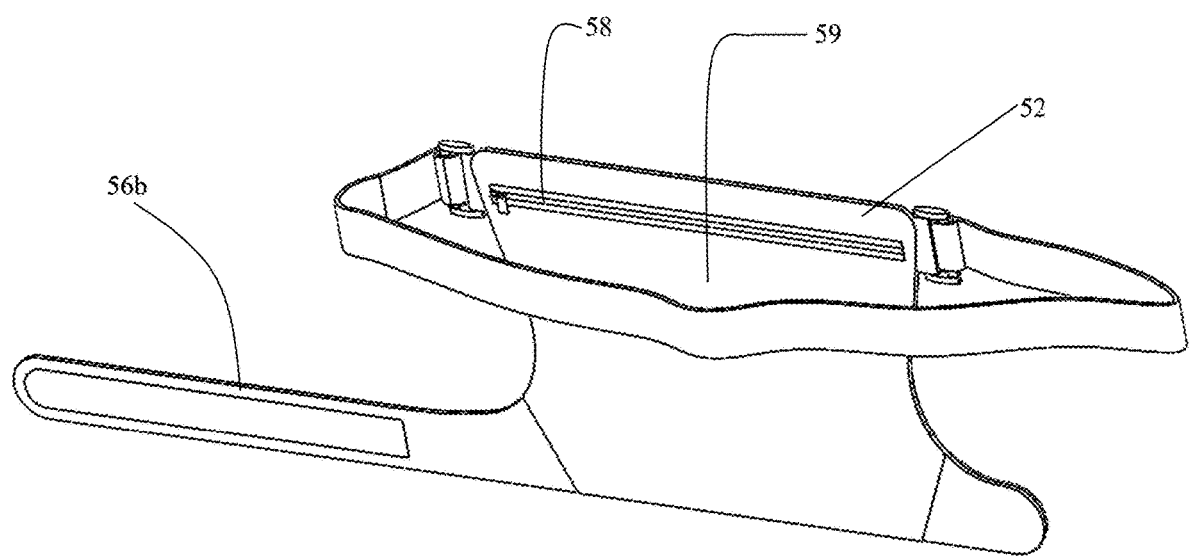
FIG. 6b: shows a back view of the shoulder harness.
Figure 6C:
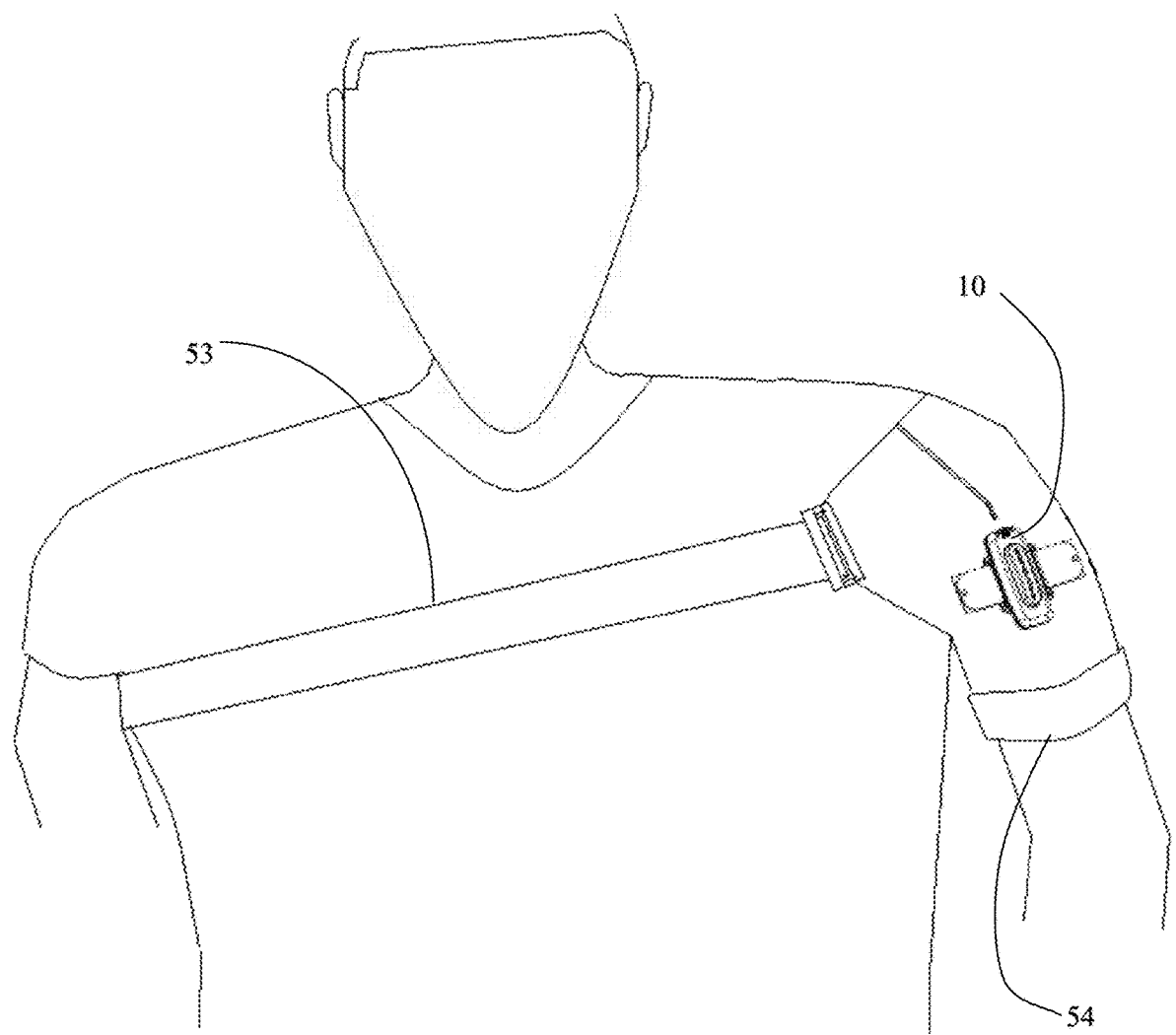
FIG. 6c: shows a view of a user wearing the shoulder harness with the wearable device affixed on it.

In another embodiment, the wellness device (10) may be provided with a shoulder harness (50), as shown in FIGS. 6(a)-6(c), to immobilize and protect the injured area, typically the shoulder, clavicle (collarbone), or upper arm. Further, the shoulder harness (50) restricts movement of the injured joint and the surrounding area, thereby reducing pain, preventing further damage, and promoting healing. The shoulder harness (50) utilizes a dual-strap system, including an arm strap (54) and a body strap (53), to securely position the wellness device (10) on the user's shoulder and upper arm, as shown in FIG. 6c. The design of the shoulder harness (50) prevents any slippage or discomfort throughout the night.

The shoulder harness (50) is affixed to the user by wrapping the body strap (53) around the torso as illustrated in FIG. 6(c) and securing it using the buckles (57). The arm strap (54) is then wrapped around the arm of the user, and secured by fastening the hooks (56a) onto the loop area (56b). The said shoulder harness (50) with the affixed wellness device (10) can be adjusted to provide adequate support and immobilization without being too tight or restrictive.

In one embodiment, the shoulder harness (50) further comprises a pouch (59) configured to receive and retain an ice pack. The pouch (59) is secured onto the back (52) of the shoulder harness (50) using a zipper (58) as illustrated in FIG. 5b. The ice pack can be used to provide localized cooling therapy to the injured area, reducing inflammation and pain.

The wearable wellness device (10) of the present invention is configured to provide flexible securing mechanisms to attach the wellness device (10) to the provided shoulder wrap (40), and the shoulder harness (50). The securing mechanisms may include straps, preferably Velcro straps (46) or snapping straps (55), to affix the wellness device (10) securely to the shoulder wrap (40) or the shoulder harness (50), keeping it firmly in place throughout the night. The securing mechanisms in combination with the attachment mechanisms makes it easy to achieve a comfortable and secure fit, regardless of individual preferences or body shape, further promoting consistent use and optimal effectiveness of the wellness device (10).

The arms (11a, 11b) provided on each side of the wellness device (10) are used for affixing the device (10) to the shoulder harness (50), or shoulder wrap (40). The arms (11a, 11b) also referred as affixing belt loops or strap loops or attachment points are capable of accommodating the straps (46, 55), as shown in FIGS. 5a and 6a, respectively, or bands (31), as shown in FIG. 3. The affixing straps (46, 55) or bands (31) which go through the arms (11a, 11b) to attach the wellness wearable device (10) to the shoulder harness (50) or the shoulder wrap (40), can be made of any material e.g. cloth fabric, leather, nylon, polyester or polypropylene.

In one embodiment, the arms (11a, 11b) on each side of the wellness device (10) may be removed, wherein the wellness device (10) is configured to directly being inserted into a sewn pocket on the front of the shoulder wrap or harness, thereby offering a streamlined design and a different method for attaching and securing the device. The said pocket is further provided with a closure flap configured to securely retain the device therein.

In another embodiment, the back (14c) of the bottom housing (14b) of the wellness device (10), as shown in FIG. 2, is equipped with a surface to accommodate a self-adhesive hook strip, enabling it to mate with a corresponding sewn-on loop strip on the front of the shoulder harness (50) and the shoulder wrap (40). The aforementioned different securing mechanisms allows for greater flexibility in positioning the wellness device on either of the wearable equipment, ensuring optimal comfort and effectiveness for each individual user.

While many of the fundamental characteristics and features of the wearable wellness device have been described herein, with reference to particular embodiments thereof, a latitude of modification, various changes and substitutions are intended in the foregoing disclosure, and it should be apparent that in some instances some features of the invention will be employed without a corresponding use of other features without departing from the scope of the invention as set forth. It should be understood that such substitutions, modifications, and variations may be made by those skilled in the art without departing from the spirit and scope of the invention. Consequently, all such modifications and variations are included within the scope of the invention as defined herein.

The invention claimed is:

1. A wearable device for monitoring and correcting sleep posture, comprising:
   a housing configured to be worn by a user near the site of injury on an arm or shoulder;
   a pressure-activated trigger disposed within the housing, wherein the pressure-activated trigger is strategically positioned to detect when the user rolls onto an undesirable sleep position;
   a battery powered vibration unit configured to generate a vibratory alert when the pressure-activated trigger is activated, wherein the vibration unit further comprises a vibration motor disposed within the housing;
   an intensity control mechanism coupled to the vibration motor, wherein the intensity control mechanism is configured to allow the user to select among a plurality of vibration intensity levels generated by the vibration motor;
   an audible alert unit configured to generate an audible alert after a predetermined time-delay if the user does not respond to the vibratory alert;
   an adjustable attachment mechanism for securing the device onto the user's body.

2. The wearable device of claim 1, wherein the vibration motor is a battery-powered motor configured to generate vibrations of various intensities.

3. The wearable device of claim 1, wherein the intensity control mechanism further comprises a slide switch configured to allow selection from a plurality of discrete vibration intensity levels, including at least an off setting, a low intensity setting, a medium intensity setting, and a high intensity setting.

4. The wearable device of claim 1, wherein the audible alert unit comprises a miniature speaker disposed within the housing and configured to emit a sound to alert the user.

5. The wearable device of claim 1, wherein the predetermined time-delay for the audible alert is adjustable based on the user preference.

6. The wearable device of claim 1, wherein the attachment mechanism comprises a shoulder harness, a shoulder wrap, or an armband configured to securely attach the device to the user's arm or shoulder.

7. The wearable device of claim 6, wherein the shoulder harness comprises:
   an arm strap configured to encircle the user's arm and secured by fastening hooks onto loops; and
   a body strap configured to encircle the user's torso and secured using a buckle, wherein the shoulder harness is adjustable to provide varying levels of support and immobilization.

8. The wearable device of claim 7, wherein the shoulder harness further comprises a pouch configured to receive and retain an ice pack, the pouch being secured to the back of the shoulder harness.

9. The wearable device of claim 6, wherein the shoulder wrap is configured to be worn on the user's upper arm and comprises a first strap having a first hook fastener and a second strap having a second hook fastener, the first and second hook fasteners being configured to engage with a loop fastener to securely fasten the shoulder wrap around the user's arm.

10. The wearable device of claim 6, wherein the armband adapted to be secured around the user's arm further comprises a plurality of fastening bands configured to engage with corresponding arms on the housing of the device.

11. The wearable device of claim 6, wherein the attachment mechanism further comprises a flexible securing mechanism to affix the device onto the shoulder harness, the armband, and the shoulder wrap.

12. The wearable device of claim 11, wherein the securing mechanism comprises a self-adhesive strip affixed to the bottom of the housing of the device configured to mate with a corresponding strip on the shoulder harness or the shoulder wrap.

13. The wearable device of claim 11, wherein the securing mechanism comprises adjustable straps with hook and loop fasteners configured to secure the device to the shoulder harness, the armband, or the shoulder wrap.

14. The wearable device of claim 11, wherein the securing mechanism comprises a sewn pocket with a closure flap on the shoulder harness or the shoulder wrap configured to receive and retain the device.

15. The wearable device of claim 1, wherein the device is configured to be used for a variety of injuries and surgical recoveries.

16. The wearable device of claim 1, wherein the housing and the attachment mechanism are ergonomically designed to be comfortable for extended wear during sleep.

17. The wearable device of claim 1, further comprising one or more arms removably connected to the housing.

18. A method of monitoring and correcting sleep posture, comprising:
   attaching a wearable device to a user's arm or shoulder, the wearable device comprising a pressure-activated trigger, a vibration motor, an intensity control mechanism, and an audible alert unit;
   setting the desired level of vibration alert through the intensity control mechanism;
   detecting a change in the sleep posture of the user through the pressure-activated trigger;
   generating a vibratory alert through the vibration motor in response to the detection to alert the user when the user assumes a predetermined sleep position, wherein the pressure-activated trigger activates the vibration alert when the user rolls onto the predetermined sleep position; and
   generating an audible alert via the audible alert unit if the user does not respond to the vibratory alert after a predetermined time-delay.

19. The method of monitoring and correcting sleep posture of claim 18, wherein the intensity control mechanism comprises slide switch and the multi-switch setting, wherein the multi-switch setting includes settings of off, low, medium, and high.

20. A wearable device for monitoring and correcting sleep posture, comprising:
   a housing configured to be worn by a user near the site of injury on an arm or shoulder;
   a pressure-activated trigger disposed within the housing, wherein the pressure-activated trigger is strategically positioned to detect when the user rolls onto an undesirable sleep position;
   an alert unit configured to generate an alert when the pressure-activated trigger is activated;
   an intensity control mechanism coupled to the alert unit, wherein the intensity control mechanism is configured to allow the user to select among a plurality of alert levels generated by the alert unit; and
   a shoulder harness including:
      an arm strap configured to encircle the user's arm; and
      a body strap configured to encircle the user's torso, wherein the shoulder harness is adjustable to provide varying levels of support and immobilization.

\* \* \* \* \*